(12) United States Patent
Wu

(10) Patent No.: US 9,506,542 B2
(45) Date of Patent: Nov. 29, 2016

(54) LINEAR ACTUATOR AND BUFFER MECHANISM THEREOF

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 364 days.

(21) Appl. No.: 14/459,308

(22) Filed: Aug. 13, 2014

(65) Prior Publication Data

US 2015/0377329 A1    Dec. 31, 2015

(30) Foreign Application Priority Data

Jun. 27, 2014   (TW) .............................. 103122359 A

(51) Int. Cl.
*F16H 25/20*    (2006.01)

(52) U.S. Cl.
CPC ......... *F16H 25/20* (2013.01); *F16H 2025/209* (2013.01); *F16H 2025/2031* (2013.01); *F16H 2025/2046* (2013.01); *F16H 2025/2071* (2013.01); *F16H 2025/2084* (2013.01)

(58) Field of Classification Search
CPC ........... F16H 25/20; F16H 2025/2046; F16H 2025/2071; F16H 2025/2084; F16H 2025/2031

See application file for complete search history.

(56) References Cited

U.S. PATENT DOCUMENTS

2006/0043804 A1* 3/2006 Kondou ............. B60G 17/0157
                                                           310/68 B
2009/0283371 A1* 11/2009 Winkler ................. F16D 65/18
                                                             188/72.6
2010/0319472 A1* 12/2010 Wei ...................... F16H 25/2021
                                                              74/89.37
2011/0259600 A1* 10/2011 Segura .................... E21B 41/00
                                                                166/374
2013/0112104 A1*  5/2013 Tamai ...................... B61F 5/245
                                                              105/199.2
2014/0209301 A1*  7/2014 Segura .................... E21B 41/00
                                                              166/250.01
2014/0326089 A1* 11/2014 Wu ......................... F16H 25/20
                                                              74/89.23

FOREIGN PATENT DOCUMENTS

DE     202007001797 U1    4/2007
DE     102010044793 B4   10/2013
TW        M314280 U       6/2007

(Continued)

OTHER PUBLICATIONS

Office Action dated Apr. 10, 2015 of the corresponding German patent application No. 102014112549.5.

(Continued)

*Primary Examiner* — David M Fenstermacher
(74) *Attorney, Agent, or Firm* — HDLS IPR Services; Chun-Ming Shih

(57) ABSTRACT

A linear actuator includes a gearbox, a motor structure, a lead screw, a telescopic tube, a quick release mechanism and a buffer mechanism. The motor structure is connected to the gearbox. The lead screw has a part inside the gearbox and the other part outside. The telescopic tube has a nut screwed with the lead screw. The quick release mechanism inside the gearbox is coupled to a cylindrical coupling member and a worm gear. The cylindrical coupling member is rotated with the lead screw, and the worm gear is driven by the motor structure to clutch the cylindrical coupling member. The buffer mechanism is installed at the external periphery of the lead screw and between the nut and gearbox for absorbing impact forces.

16 Claims, 7 Drawing Sheets

(56) References Cited

FOREIGN PATENT DOCUMENTS

| | | |
|---|---|---|
| TW | M460961 U | 9/2013 |
| TW | M462313 U | 9/2013 |
| TW | M487964 U | 10/2014 |

OTHER PUBLICATIONS

Office Action dated Nov. 19, 2015 of the corresponding Taiwan patent application.

* cited by examiner

LINEAR ACTUATOR AND BUFFER MECHANISM THEREOF

FIELD OF THE INVENTION

The present invention relates to a linear actuator, and more particularly to the linear actuator with a buffer mechanism.

BACKGROUND OF THE INVENTION

Linear actuator is used extensively in many areas and installed to electric hospital beds, treadmills, wheelchairs, etc for adjusting a position, a height, and an angle of elevation. In particular, a quick release mechanism is provided for releasing the actuator quickly in the process of treating a patient in an emergency situation, so that the bed can be adjusted quickly to strive to earn the most precious recue time. However, the patient may be injured by the impact produced by a rapid drop of the bed. Therefore, it is a main subject of the present invention to provide a buffer effect for the rapid drop of the bed.

In general, a conventional linear actuator comprises a motor, a transmission mechanism and a quick release mechanism, wherein the motor includes a worm, and the transmission mechanism includes a lead screw and a worm gear sheathed and coupled to the lead screw and engaged and transmitted with the worm, and the quick release mechanism includes two cylindrical coupling members, and one of the cylindrical coupling members is fixed and coupled to the lead screw and rotated with the lead screw, and the other cylindrical coupling member is fixed and coupled to the worm gear and rotated with the worm gear, and a torque transmission element is installed at a corresponding end of each cylindrical coupling member, and the clutch effect between the cylindrical coupling members is provided for the transmission of the lead screw and the worm gear or releasing the transmission.

However, the actual applications of the conventional linear actuator still have the following problems. In the conventional linear actuator, a pneumatic rod is generally installed next to the linear actuator to provide the buffer function, but the additionally installed pneumatic rod incurs a more complicated structure and a higher manufacturing cost of the bed. In addition, the impact force produced by the gravitational acceleration is usually much greater than the maximum load bearable by the pneumatic rod, and thus not just damaging the pneumatic rod only, but also failing to protect the patient comprehensively. Obviously, the conventional linear actuator requires improvements.

SUMMARY OF THE INVENTION

Therefore, it is a primary objective of the present invention to provide a linear actuator and a buffer mechanism of the linear actuator capable of absorbing impact forces produced during a rapid drop of a telescopic tube of the linear actuator.

To achieve the aforementioned objective, the present invention provides a linear actuator, comprising: a gearbox, a motor structure, a lead screw, a telescopic tube, a quick release mechanism and a buffer mechanism, wherein the motor structure is coupled to the gearbox; the lead screw has a part contained in the gearbox and the other part protruded to the outside; the telescopic tube has a nut screwed and transmitted with the lead screw; the quick release mechanism is contained in the gearbox and includes a cylindrical coupling member sheathed and coupled to the lead screw and a worm gear formed on a lateral side of the cylindrical coupling member, and the cylindrical coupling member is rotated with the lead screw, and the worm gear is driven by the motor structure and selectively clutched with the cylindrical coupling member; and the buffer mechanism is sheathed on the external periphery of the lead screw and disposed between the nut and the gearbox.

To achieve the aforementioned objective, the present invention provides a buffer mechanism of a linear actuator, and the linear actuator comprises a gearbox, a lead screw and a telescopic tube, wherein the telescopic tube has a nut screwed and transmitted with the lead screw, and the buffer mechanism is sheathed on the external periphery of the lead screw and disposed between the nut and the gearbox.

The present invention further has the following effects: a coil spring made by rolling a plate provides a relatively greater axial bearing force to bear various different loads. With the installation of the first limit ring and prongs, the invention not just securely holds an end of the coil spring to prevent the coil spring from being deviated in the radial direction only, but also prevents the coil spring from being deformed or damaged by improper action and impact forces. The second limit ring is fixed into the receiving opening of the gearbox to provide a limit effect of preventing the coil spring from moving in the axial direction.

DESCRIPTION OF THE PREFERRED EMBODIMENTS

Figure 1:
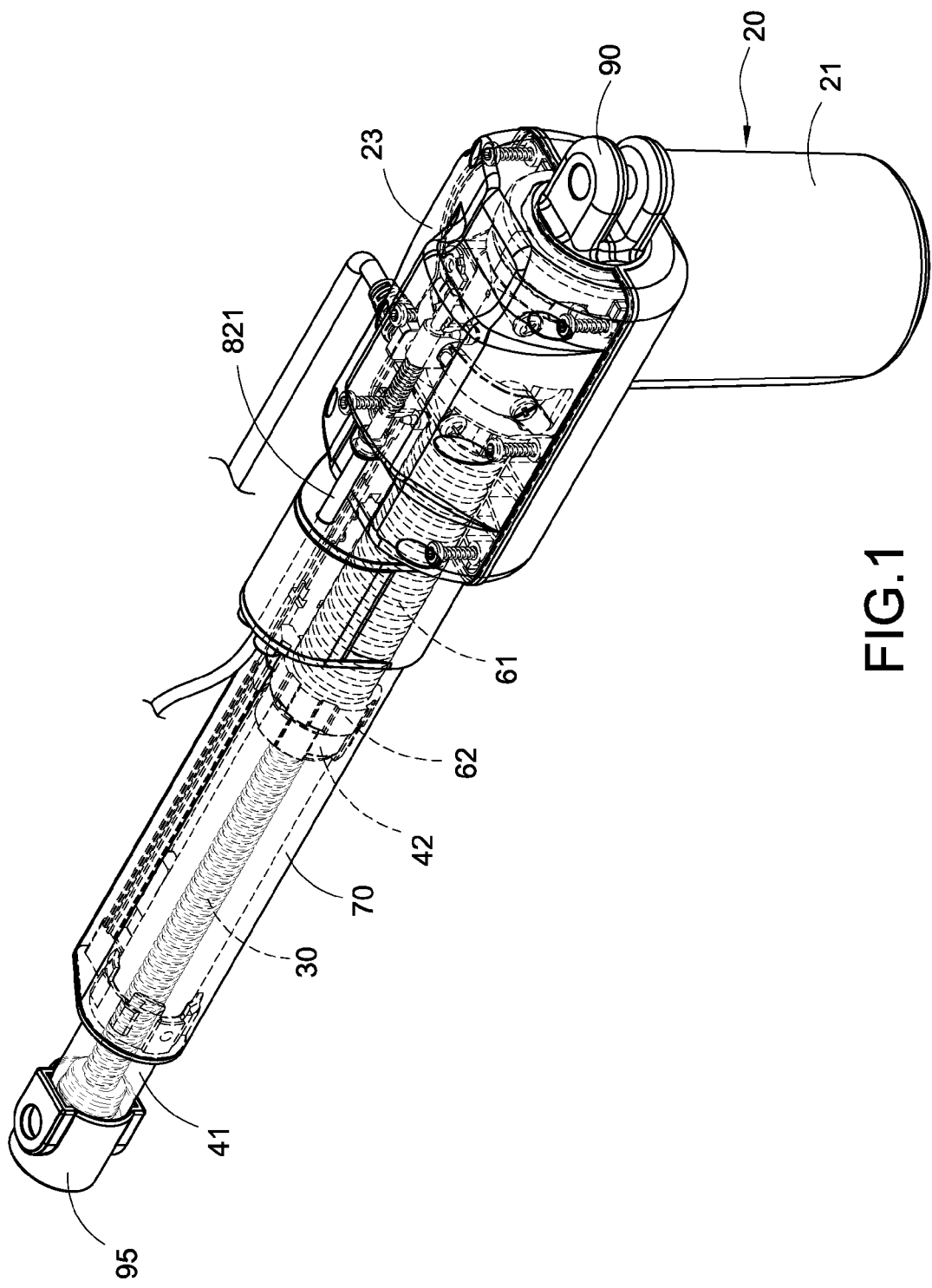
FIG. 1 is a perspective view of a linear actuator of the present invention.

The technical contents of the present invention will become apparent with the detailed description of a preferred embodiment accompanied with the illustration of related drawings as follows.

With reference to FIGS. 1 to 6 for a linear actuator and a buffer mechanism of the linear actuator, the linear actuator comprises a gearbox 10, a motor structure 20, a lead screw 30, a telescopic tube 40, a quick release mechanism 50 and a buffer mechanism 60.

Figure 3:
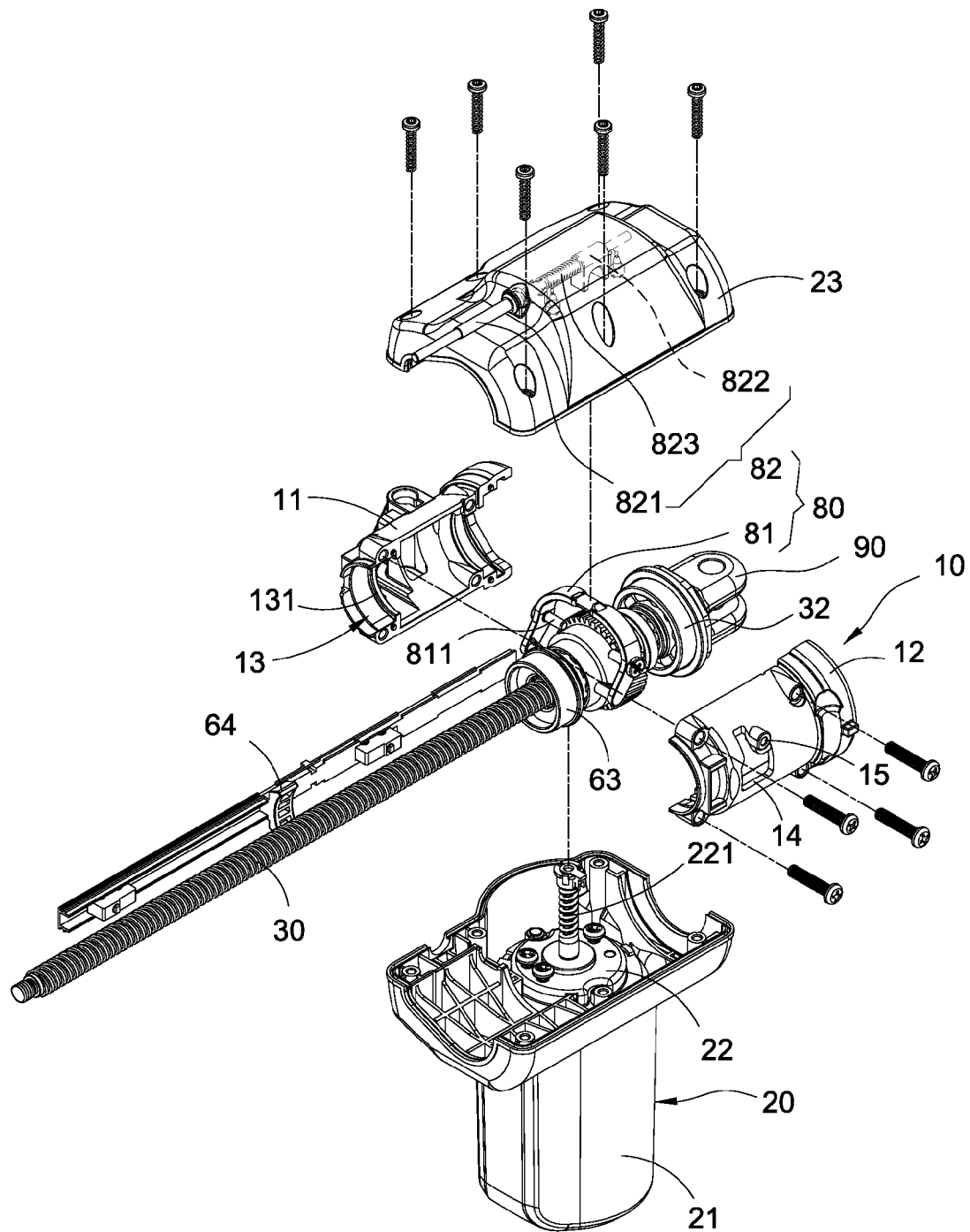
FIG. 3 is an exploded view showing a motor structure, a gearbox and a lead screw of the present invention.

In FIG. 3, the gearbox 10 comprises a left casing 11 and a right casing 12 engaged with the left casing 11, and both casings 11, 12 are substantially in a semicircular arc shape and connected to form a hollow cylinder by fasteners such as screws, and a receiving opening 13 is formed at the front of the gearbox 10, and an embedding groove 131 is formed on the inner wall surface of the receiving opening 13. In addition, a through slot 14 is formed at a corresponding position of each casing 11, 12, and a pivot seat 15 is formed at the edge of the through slot 14.

The motor structure 20 comprises a lower casing 21, a motor 22 and an upper casing 23, wherein the motor 22 is contained in the lower casing 21, and a worm 221 is extended from the center of the motor 22, and the upper casing 23 is engaged with the corresponding lower casing 21 to cover and fix the gearbox 10, and the lower casing 21 and the upper casing 23 are combined by fasteners such as screws, and the worm 221 is extended into the gearbox 10, and the motor 22 rotates the worm 221 clockwise or counterclockwise through the magnetic pole, coil and current of the motor 22.

Figure 2:
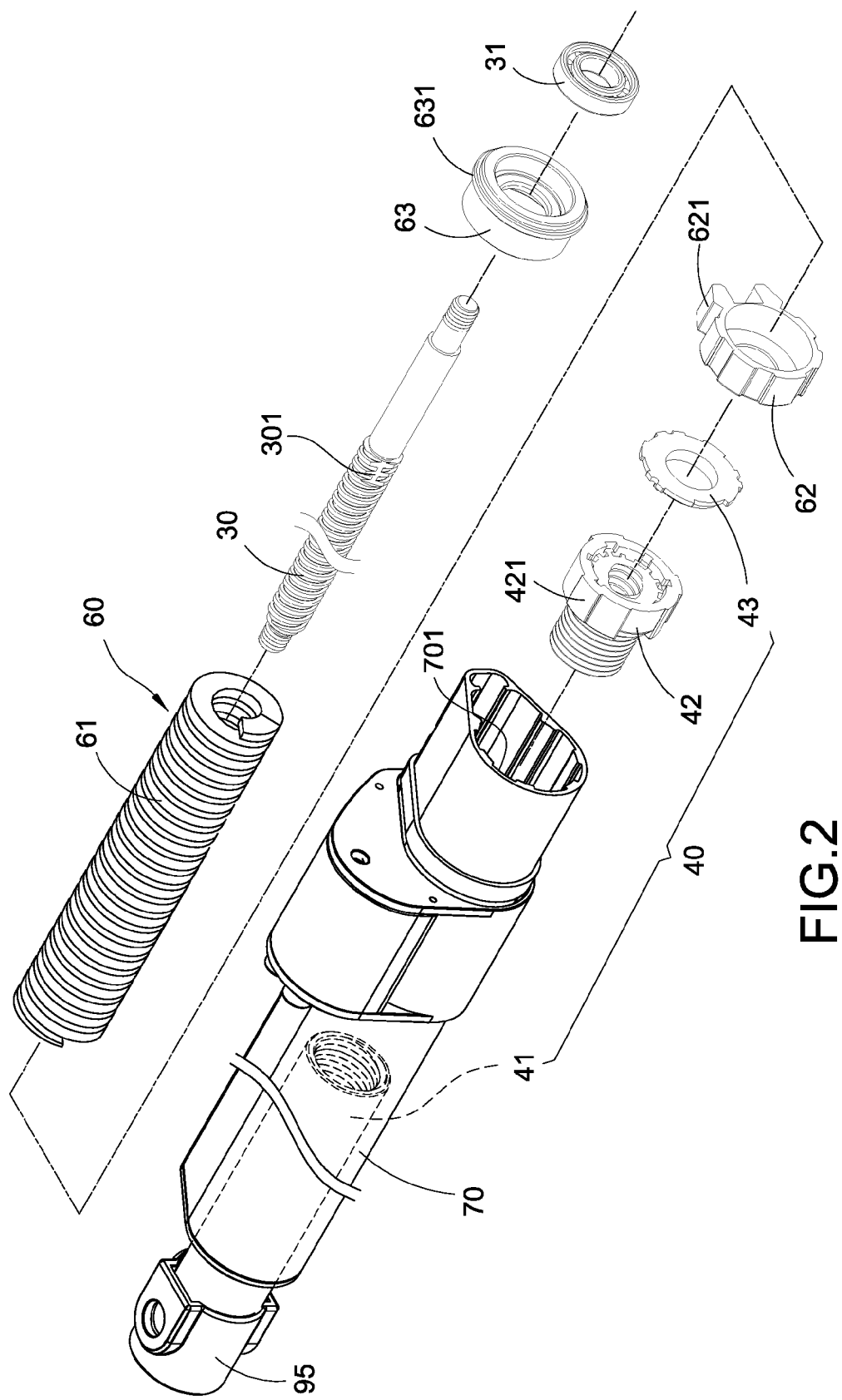
FIG. 2 is an exploded view showing an outer tube, a buffer mechanism and a lead screw of the present invention.
Figure 5:
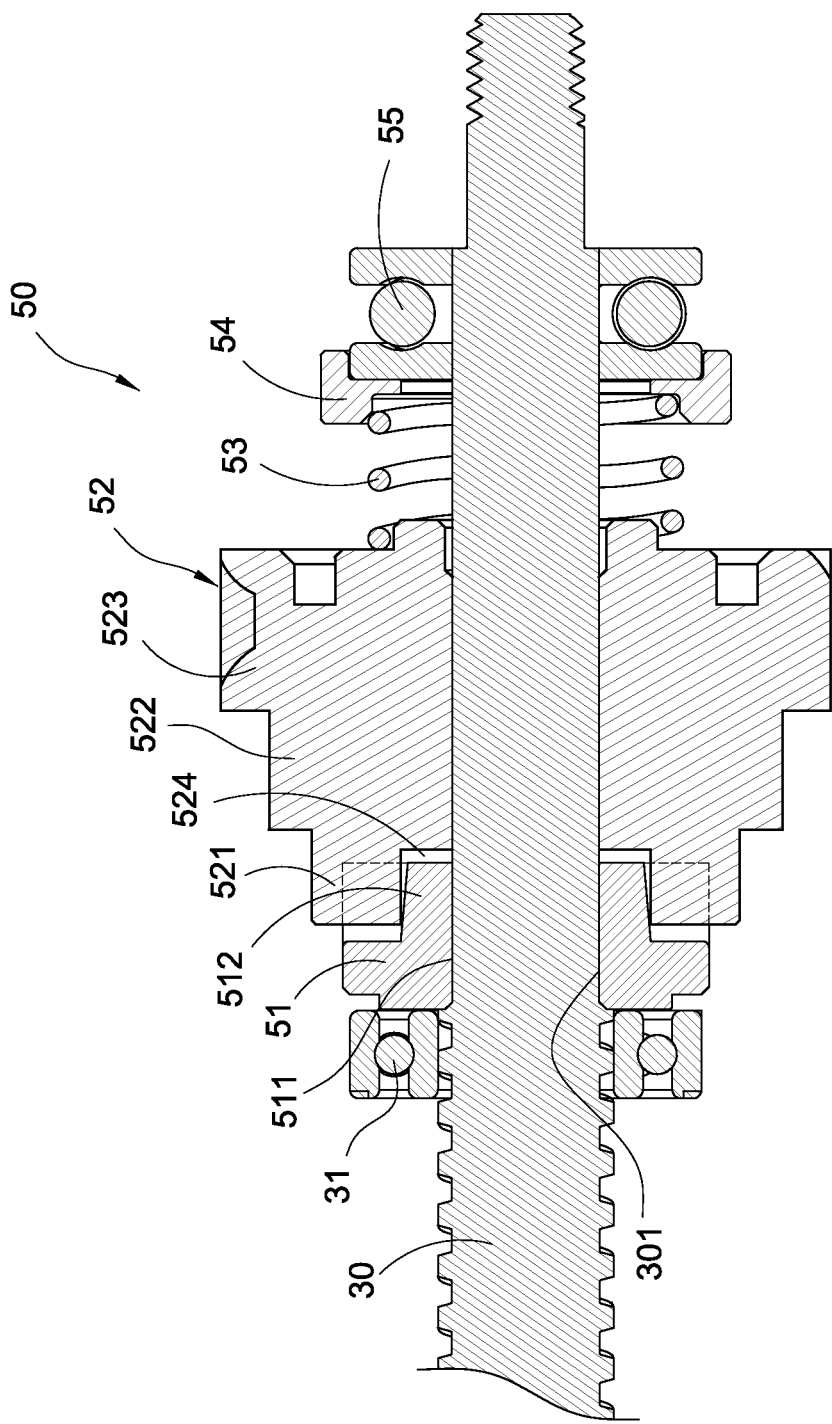
FIG. 5 is a sectional view of a quick release mechanism and a lead screw of the present invention.
Figure 6:
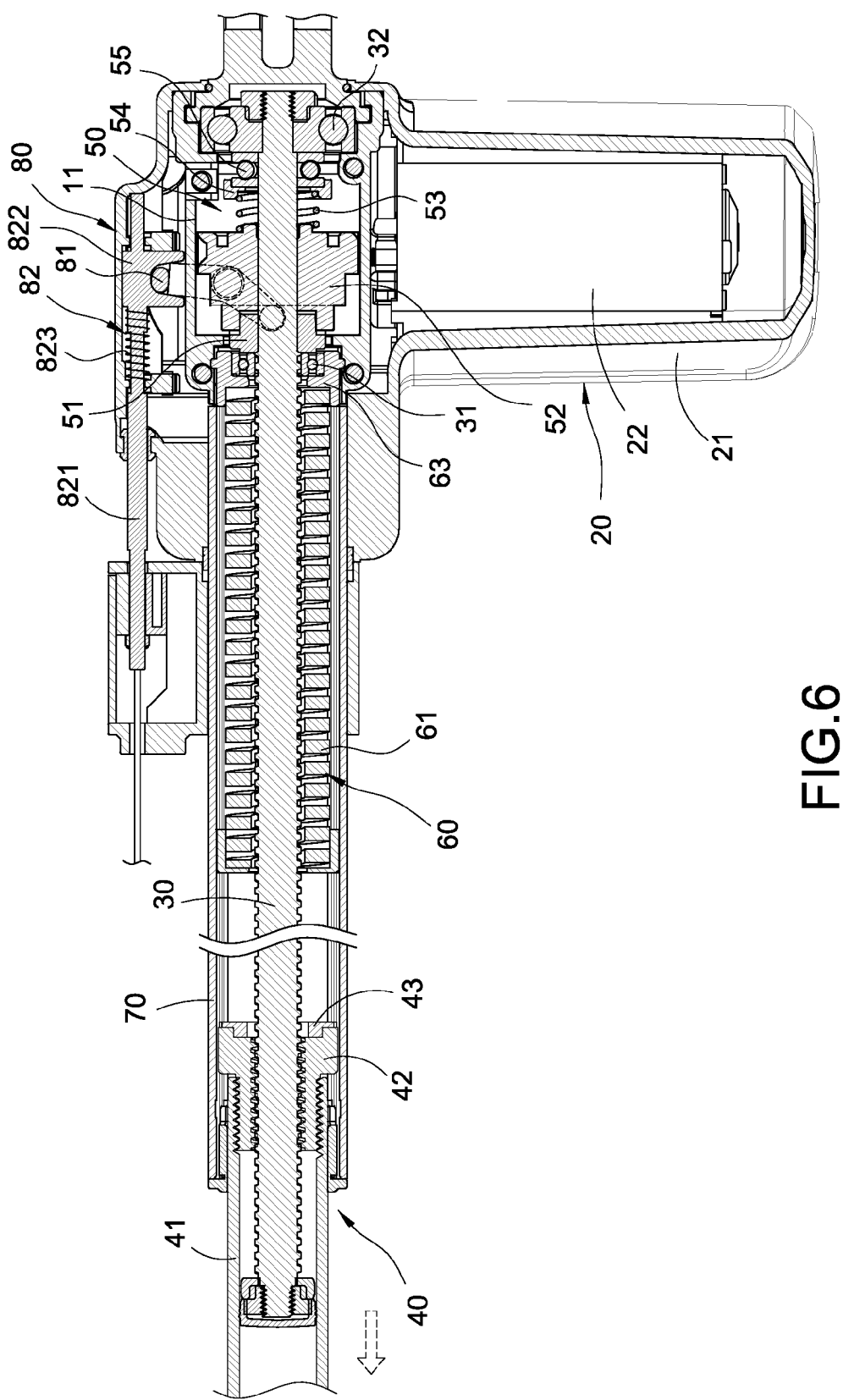
FIG. 6 is a sectional view of a linear actuator of the present invention.

In FIG. 3, the lead screw 30 as shown in FIGS. 5 and 6 is supported by a front bearing 31 and a rear bearing 32, so that the rear section is formed in the gearbox 10, and the remaining part of the lead screw 30 is extended from the gearbox 10 to the outside, and the lead screw 30 is a non-self-locking lead screw (In other words, if the telescopic tube 40 is restricted and cannot be rotated, the lead screw 30 will be rotated freely with respect to the telescopic tube 40 under the effect of the telescopic tube 40 being pushed or pressed axially, such that the telescopic tube 40 will be moved linearly. In FIG. 2, a positioning section 301 is formed at a threaded end of the lead screw 30, and the positioning section 301 includes two parallel planes.

In FIG. 2, the telescopic tube 40 comprises an inner tube 41 and a nut 42 fixed to an end of the inner tube 41, wherein the inner tube 41 is sheathed on the external periphery of the lead screw 30, and the nut 42 is screwed and transmitted with the lead screw 30. Since the nut 42 is made of polyoxymethylene (P.O.M), so that the telescopic tube 40 further includes an impact-resistant element 43 made of a metal with relatively greater strength and hardness, and the impact-resistant element 43 is fixed on an end surface of the inner tube 41 that is away from the nut 42.

Figure 4:
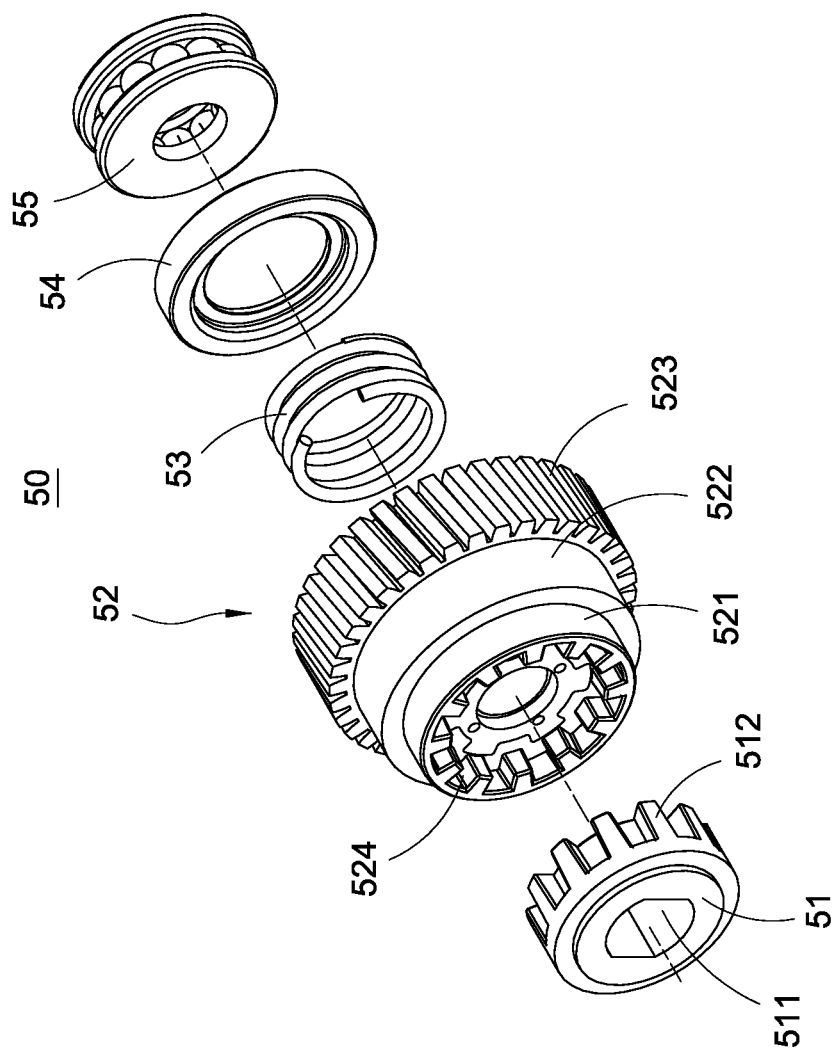
FIG. 4 is an exploded view of a quick release mechanism of the present invention.

In FIG. 4, the quick release mechanism 50 as shown in FIGS. 5 and 6 is contained in the gearbox 10 and includes a cylindrical coupling member 51 and a worm gear 52, wherein the cylindrical coupling member 51 is sheathed and coupled to the lead screw 30, and the worm gear 52 is also sheathed and coupled to the lead screw 30 and formed on a lateral side of the cylindrical coupling member 51, and a positioning hole 511 is formed at the center of the cylindrical coupling member 51 and sheathed and coupled to the positioning section 301 of the lead screw 30, so that the cylindrical coupling member 51 can be rotated with the lead screw 30. In addition, a plurality of protruding key 512 is disposed with an interval apart with each other on the external periphery of the cylindrical coupling member 51, and the worm gear 52 includes a clutch section 521, a pushed section 522 extended axially from the clutch section 521, and a gear section 523 extended axially from the pushed section 522, wherein the gear section 523 is engaged with and driven by the worm 221, and a plurality of key slots 524 is formed inside the clutch section 521 for embedding the protruding keys 512 respectively, so that the worm gear 52 may selectively separate or embed the cylindrical coupling member 51.

The quick release mechanism 50 further includes a compression spring 53, a socket ring 54 and a radial bearing 55, and an end of the compression spring 53 is sheathed and coupled to the worm gear 52, and the other end of the compression spring 53 is contained in the socket ring 54, and the radial bearing 55 is clamped between the rear bearing 32 and the socket ring 54, and the radial bearing 55 is provided for the smooth rotation of the compression spring 53, the socket ring 54 and the worm gear 52.

The buffer mechanism 60 as shown in FIGS. 2 and 6 is sheathed on the external periphery of the lead screw 30 and disposed between the nut 42 and the gearbox 10. The buffer mechanism 60 comprises a coil spring 61, a first limit ring 62 and a second limit ring 63, wherein the coil spring 61 is formed by rolling a piece of plate-like tool steel, and the plate has a rectangular cross-section, and an end of the coil spring 61 is passed and coupled into the first limit ring 62, and two prongs 621 are protruded outwardly from the circumferential surface of the first limit ring 62, and a receptacle 64 is formed on a moving path parallel to the telescopic tube 40, and the prongs 621 are plugged into the receptacles 64 respectively, so as to provide an effect of preventing the coil spring 61 from being deviated in an axial direction, and the impact-resistant element 43 is fixed to an end of the nut 42 in a direction facing towards the first limit ring 62. The other end of the coil spring 61 is contained in the second limit ring 63, and the second limit ring 63 is fixed into the receiving opening 13 of the gearbox 10, and a flange 631 protruded from the external periphery of the second limit ring 63 and embedded into the embedding groove 131, and the second limit ring 63 is primarily used for preventing the coil spring 61 from moving in the axial direction.

In FIGS. 2 and 6, the linear actuator of the present invention further comprises an outer tube 70 sheathed along the external periphery of the lead screw 30, and an end of the outer tube 70 abuts and connects the gearbox 10, and is covered and fixed by the lower casing 21 and the upper casing 23. The telescopic tube 40 is passed and coupled into the outer tube 70, and a plurality of guide grooves 701 is formed on an inner wall of the outer tube 70, and a plurality of guide blocks 421 is protruded from the external peripheral surface of the nut 42 and embedded into the guide grooves 701 respectively, so that the telescopic tube 40 may be moved linearly in the axial direction with respect to the outer tube 70.

In FIG. 3, the linear actuator of the present invention further comprises a pulling mechanism 80, and the pulling mechanism 80 comprises a pulling handle 81 and a pulling rod module 82, wherein the pulling handle 81 is substantially u-shaped and pivoted to each pivot seat 15 of the gearbox 10 through a bolt, and a pair of arms 811 are extended inwardly towards an open end of the pulling handle 81. The pair of arms 811 corresponsive to the through slots 14 are extended into the gearbox 10, and the arms 811 are pressed and attached onto the position (as shown in FIG. 6) on an end surface of the pushed section 522 of the worm gear 52. The pulling rod module 82 is installed at the upper casing 23 of the motor structure 20 and includes a pulling rod 821, a moving block 822 and a return spring 823 fixed to the pulling rod 821, and the pulling rod 821 is passed and coupled to the upper casing 23, and the moving block 822 is sheathed and coupled to a closed end of the pulling handle 81, and the return spring 823 is elastically clamped between an inner wall surface of the upper casing 23 and the moving block 822.

Figure 7:
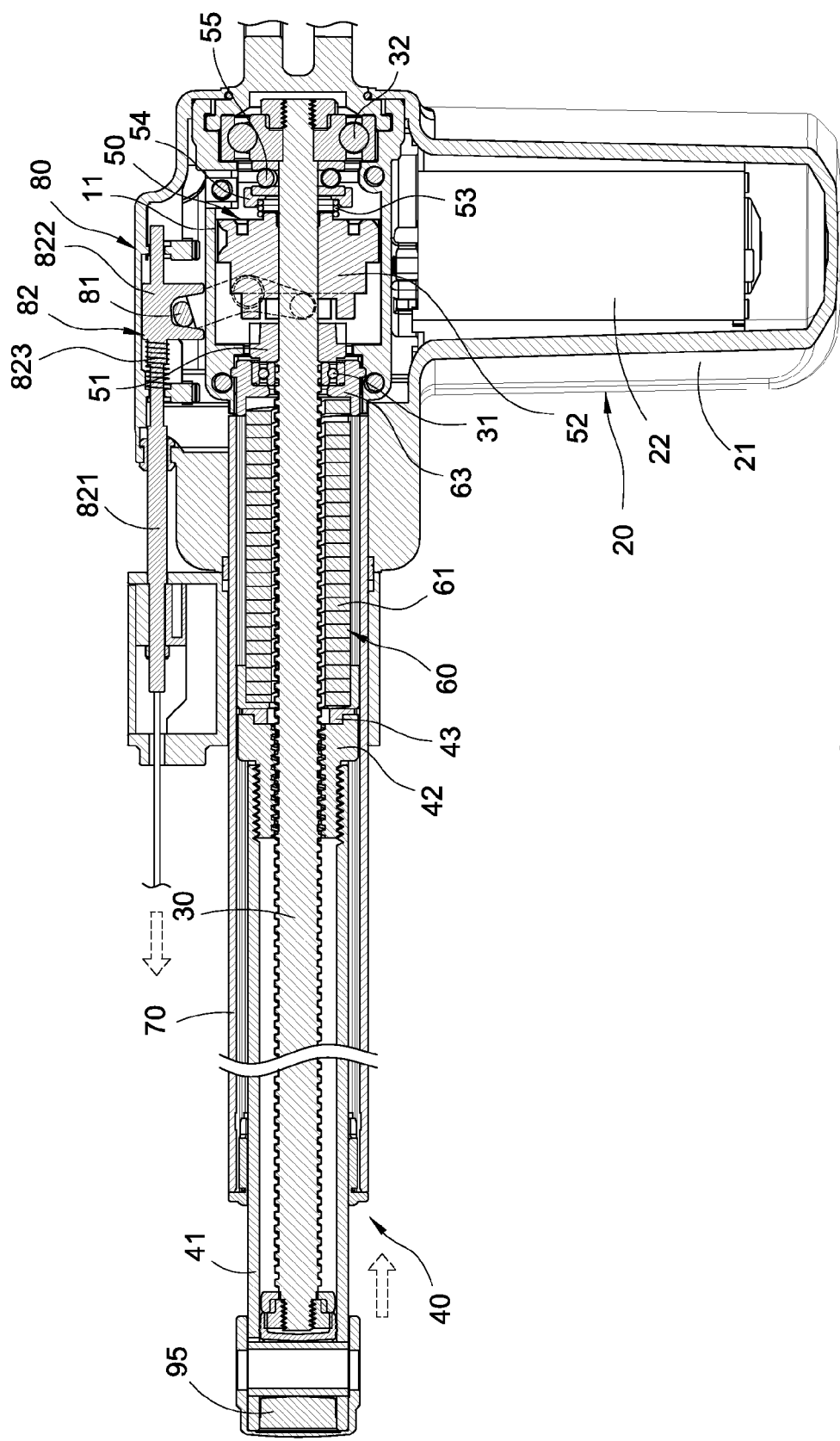
FIG. 7 is a sectional view showing the using status of a linear actuator of the present invention.

In FIGS. 3 and 7, the linear actuator of the present invention further comprises a back holder 90 and a front holder 95, and the back holder 90 is sheathed on the rear bearing 32 and fixed by the casings 11, 12 of the gearbox 10, and the front holder 95 is sheathed and coupled to an end of the telescopic tube 40 that is away from the nut 42.

In FIG. 6, the back holder 90 and the front holder 95 are fixed onto an electric bed (not shown in the figure) during an operation, the rotation of the worm 221 drives the worm gear 52 to rotate, and the worm gear 52 drives the lead screw 30 to rotate. Since the telescopic tube 40 is limited by the outer tube 70, therefore, the telescopic tube 40 is moved linearly in an axial direction with respect to the lead screw 30 during the rotation process of the lead screw 30, so as to lift up the front section of the electric bed.

In FIG. 7, when it is necessary to apply an electric shock to a patient who lies on a bed in an emergency, the pulling rod 821 is pulled, so that the moving block 822 drives the pulling handle 81, and the pulling handle 81 rotates counterclockwise by using the pivot seat 15 as the center of the rotation. Now, each arm 811 pushes the worm gear 52 to move in a direction away from the cylindrical coupling member 51, so that the protruding keys 512 of the cylindrical coupling member 51 and the key slots 524 of the worm gear 52 are separated from each other and released, and the bodyweight of the patient or a medical professional may apply a pressure to the front section of the electric bed. After the aforementioned pressure is exerted onto the telescopic tube 40, the lead screw 30 is rotated quickly and retracted into outer tube 70, and the impact-resistant element 43 directly impacts on the first limit ring 62, and the elastic force and restoring force of the coil spring 61 absorbs the impact force when the telescopic tube 40 and the nut 42 fall quickly.

While the invention has been described by means of specific embodiments, numerous modifications and variations could be made thereto by those skilled in the art without departing from the scope and spirit of the invention set forth in the claims.

What is claimed is:

1. A linear actuator, comprising:
    a gearbox;
    a motor structure, coupled to the gearbox;
    a lead screw, with a part contained in the gearbox and the other part protruded from the gearbox to the outside;
    a telescopic tube, having a nut screwed and transmitted with the lead screw;
    a quick release mechanism, contained in the gearbox, and including a cylindrical coupling member sheathed on the lead screw and a worm gear formed on a side of the cylindrical coupling member, and the cylindrical coupling member rotating with the lead screw, and the worm gear being driven by the motor structure to selectively clutch the cylindrical coupling member; and
    a buffer mechanism, sheathed on the external periphery of the lead screw and disposed between the nut and the gearbox.

2. The linear actuator of claim 1, wherein the buffer mechanism includes a coil spring, and the coil spring is formed by rolling a plate.

3. The linear actuator of claim 2, wherein the buffer mechanism further comprises a first limit ring, and an end of the coil spring is passed into and coupled to the first limit ring.

4. The linear actuator of claim 3, wherein the buffer mechanism further comprises a second limit ring, and the gearbox has a receiving opening formed thereon, and the second limit ring is fixed to the receiving opening, and the other end of the coil spring is contained into the second limit ring.

5. The linear actuator of claim 4, wherein the receiving opening has an embedding groove formed on an inner wall surface of the receiving opening, and the second limit ring has a flange protruded from the external periphery of the second limit ring and embedded into the embedding groove.

6. The linear actuator of claim 3, wherein the first limit ring has a plurality of prongs protruded from the circumferential surface of the first limit ring, and a receptacle is formed at the moving path parallel to the telescopic tube, and each prong is plugged into the corresponding receptacle.

7. The linear actuator of claim 3, wherein the telescopic tube further comprises an impact-resistant element, and the impact-resistant element is fixed onto an end surface of the nut facing towards the first limit ring.

8. The linear actuator of claim 1, wherein the worm gear comprises a clutch section, a pushed section axially extended from the clutch section and a gear section axially extended from the pushed section, and the clutch section is combined with the corresponding cylindrical coupling member, and the motor structure includes a motor, and a worm extended from the center of the motor, and the gear section is driven by the worm.

9. The linear actuator of claim 8, further comprising a pulling mechanism, and the pulling mechanism including a pulling handle and a pulling rod module, and the pulling handle being pivotally coupled to the gearbox and having a set of arms extended from the pulling handle, and each arm being attached onto a lateral side of the pushed section, and the motor structure including an upper casing, and the pulling rod module being installed at the upper casing and including a pulling rod, a moving block fixed to the pulling rod and a return spring, and the moving block being sheathed and coupled to the pulling handle, and the return spring being sheathed and coupled to the pulling rod and elastically clamped between the upper casing and the moving block.

10. The linear actuator of claim 1, wherein the quick release mechanism further comprises a compression spring, a socket ring and a radial bearing, and an end of the compression spring is sheathed and coupled to the worm gear, and the other end of the compression spring is contained in the socket ring, and an end surface of the radial bearing abuts a lateral side of the socket ring.

11. A buffer mechanism of a linear actuator, and the linear actuator includes a gearbox, a lead screw and a telescopic tube, and the telescopic tube has a nut screwed and transmitted with the lead screw, and the buffer mechanism is sheathed on the external periphery of the lead screw and disposed between the nut and the gearbox.

12. The buffer mechanism of claim 11, wherein the buffer mechanism includes a coil spring, and the coil spring is formed by rolling a plate.

13. The linear actuator of claim 12, wherein the buffer mechanism further comprises a first limit ring, and an end of the coil spring is passed into and coupled to the first limit ring.

14. The linear actuator of claim 13, wherein the buffer mechanism further comprises a second limit ring, and the second limit ring is fixed to the gearbox, and the other end of the coil spring is contained in the second limit ring.

15. The linear actuator of claim 14, wherein the gearbox has an embedding groove, and the second limit ring has a flange protruded from the external periphery of the second limit ring and embedded into the embedding groove.

16. The linear actuator of claim 13, wherein the first limit ring has a plurality of prongs protruded from the circumferential surface of the first limit ring, and a receptacle is disposed on a moving path parallel to the telescopic tube, and each prong is plugged into the corresponding receptacle.

* * * * *